United States Patent
Meffe

(10) Patent No.: US 6,834,561 B2
(45) Date of Patent: Dec. 28, 2004

(54) RADIALLY ACTUATED CONTROL MOMENT GYROSCOPE

(75) Inventor: Marc E. Meffe, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/227,218

(22) Filed: Aug. 22, 2002

(65) Prior Publication Data

US 2004/0035229 A1 Feb. 26, 2004

(51) Int. Cl.[7] .................. G01C 19/30; G01C 19/28
(52) U.S. Cl. ........................... 74/5.46; 74/5.6 R
(58) Field of Search ................. 74/5 R, 5.22, 5.4, 74/5.41, 5.46, 5.47, 5.6 R, 5.6 D, 5.6 E

(56) References Cited

U.S. PATENT DOCUMENTS

| | | | | |
|---|---|---|---|---|
| 2,225,014 A | * | 12/1940 | Lauck et al. | 33/317 R |
| 2,561,367 A | * | 7/1951 | Haskins, Jr. | 74/5.4 |
| 2,857,122 A | * | 10/1958 | Maguire | 244/93 |
| 3,105,657 A | | 10/1963 | Mueller et al. | |
| 3,936,716 A | * | 2/1976 | Bos | 318/591 |
| 3,974,701 A | * | 8/1976 | Erdley | 73/504.03 |
| 4,522,355 A | * | 6/1985 | Moran | 244/3.2 |
| 4,611,863 A | | 9/1986 | Isely | |
| 4,961,352 A | | 10/1990 | Downer et al. | |
| 5,386,738 A | | 2/1995 | Havenhill | |
| 5,476,018 A | | 12/1995 | Nakanishi et al. | |
| 5,898,421 A | * | 4/1999 | Quinn | 345/156 |

* cited by examiner

Primary Examiner—Roger Pang

(57) ABSTRACT

The present invention provides a control moment gyroscope that overcomes many of the limitations of the prior art. The control moment gyroscope provides a radial actuator mechanism to provide rotation to an inner gimbal assembly around a gimbal axis. The radial actuator mechanism comprises a circular ring at the midpoint of the gimbal axis, the circular ring extending around the outer periphery of the inner gimbal assembly housing. The radial actuator mechanism rotates the inner gimbal assembly around the gimbal axis through the use of a non-contact motor that provides rotational force directly to the outer perimeter of the inner gimbal assembly. Because the inner gimbal assembly is rotated from the midpoint of the gimbal axis, a torque module assembly at the end of the gimbal axis is not required. Thus, the overall length of the control moment gyroscope can be reduced. Additionally, the cost and life limiting attributes of the torque module assembly can be eliminated, and the operational bandwidth of the gyroscope increased. Finally, because the inner gimbal assembly is rotated from the outer perimeter, the torque provided to the inner gimbal assembly is naturally increased by the leverage arm of the inner gimbal assembly.

7 Claims, 5 Drawing Sheets

RADIALLY ACTUATED CONTROL MOMENT GYROSCOPE

BACKGROUND OF THE INVENTION

1. Technical Field

This invention generally relates to gyroscopes, and more specifically relates control moment gyroscopes.

2. Background Art

Control moment gyroscopes are commonly used to provide attitude control for a variety of vehicles, including spacecraft and satellites. Control moment gyroscopes normally comprise a rotor and a motor to spin the rotor about a rotor axis. The rotor is typically supported in an inner gimbal assembly and is rotated about a gimbal axis using a gimbal torque motor assembly that is attached to one end of the gyroscope. A sensor module assembly is attached to the other end of the gyroscope and is used to sense the rotational position of the inner gimbal assembly about the gimbal axis to provide for control of rotation.

The control moment gyroscope is mounted within the vehicle along the axis in which it will induce a torque. During operation of the gyroscope, the rotor is spun by a motor about its rotor axis at a predetermined rate. In order to induce a torque on the spacecraft, the gimbal torque motor rotates the gimbal assembly and the spinning rotor about the gimbal axis. The rotor is of sufficient mass and is spinning at such a rate that any movement of the rotor out of its plane of rotation will induce a significant torque around an output axis that is both normal to the rotor axis and the gimbal axis. This torque is transferred to the space craft, causing the spacecraft to move in a controlled manner.

While traditional control moment gyroscopes are generally effective, they suffer from several limitations. Many of these limitations are inherent problems that are associated with actuating the gimbal assembly around the gimbal axis. For example, traditional control moment gyroscopes have required expensive and complicated torquer motors in the torque module assembly to rotate the gimbal assembly around the gimbal axis. These motors are typically expensive precision, low ripple motors and require a complex drive train (often including a precision gear train), bearings and trunions. In addition to adding expense to the control moment gyroscope, the motor and drive train create a life limiting component that is subject to wear out and gear lubrication. Additionally, the motor and drive train can create non-linearities and resonant frequencies that limit the functional bandwidth of the gyroscope. Finally, the motor typically requires expensive high precision tachometers to detect the rate of rotation.

The sensor module assembly used to sense and control the rotation of the gimbal assembly also introduces cost and complexity to the control moment gyroscope. Typically, the sensor module requires life limiting components such as slip rings, and uses expensive single speed precision resolvers.

Additional limitations in traditional control moment gyroscopes arise from the required length of the gyroscope along the gimbal axis. Specifically, in traditional designs, the torque motor assembly and sensor module assembly are mounted on opposite ends of the gimbal axis. The addition of the torque motor assembly and sensor module assembly dramatically increase the overall length of the of the control moment gyroscope. This increase in length can be unacceptable in some dimension critical applications. The increase in length is especially problematic in applications that require multiple control moment gyroscopes to provide movement capabilities in all directions.

Thus, what is needed is an improved control moment gyroscope that overcomes the limitations of traditional designs in a low cost, effect manner.

DISCLOSURE OF INVENTION

The present invention provides a control moment gyroscope that overcomes many of the limitations of the prior art. The control moment gyroscope provides a radial actuator mechanism to provide rotation to an inner gimbal assembly around a gimbal axis. The radial actuator mechanism comprises a circular ring at the midpoint of the gimbal axis, the circular ring extending around the outer periphery of the inner gimbal assembly housing. The radial actuator mechanism rotates the inner gimbal assembly around the gimbal axis through the use of a non-contact motor that provides rotational force directly to the outer perimeter of the inner gimbal assembly. Because the inner gimbal assembly is rotated from the midpoint of the gimbal axis, a torque module assembly at the end of the gimbal axis is not required. Thus, the overall length of the control moment gyroscope can be reduced. Additionally, the cost and life limiting attributes of the torque module assembly can be eliminated, and the operational bandwidth of the gyroscope increased. Finally, because the inner gimbal assembly is rotated from the outer perimeter, the torque provided to the inner gimbal assembly is naturally increased by the leverage arm of the inner gimbal assembly.

In addition to providing rotational energy, the radial actuator mechanism can also provide rotational position sensing through an optical encoder. An optical encoder pattern is printed on a portion of the circular ring and is used by an optical sensor to provide high resolution rotation measurement. Because the rotational position is provided by the optical encoder, a sensor module assembly at the end of the gimbal axis is not required, and the overall length can be further reduced.

Additionally, the radial actuator mechanism can be used to provide power and signal delivery to the inner gimbal assembly. A low frequency AC coupler between the ring and the inner gimbal assembly can be use to deliver power to the inner gimbal assembly. A high frequency AC (e.g., radio frequency) coupler can likewise be used to deliver control signals to the inner gimbal assembly. Thus, both power and control signals can be provided to the inner gimbal assembly through the radial actuator mechanism.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

BEST MODE FOR CARRYING OUT THE INVENTION

The present invention provides a control moment gyroscope that overcomes many of the limitations of the prior art. The control moment gyroscope provides a radial actuator mechanism to provide rotation to an inner gimbal assembly around a gimbal axis. The radial actuator mechanism comprises a circular ring at the midpoint of the gimbal axis, the circular ring extending around the outer periphery of the inner gimbal assembly housing. The radial actuator mechanism rotates the inner gimbal assembly around the gimbal axis through the use of a non-contact motor that provides rotational force directly to the outer perimeter of the inner gimbal assembly. Because the inner gimbal assembly is rotated from the midpoint of the gimbal axis, a torque module assembly at the end of the gimbal axis is not required. Thus, the overall length of the control moment gyroscope can be reduced. Additionally, the cost and life limiting attributes of the torque module assembly can be eliminated, and the operational bandwidth of the gyroscope increased. Finally, because the inner gimbal assembly is rotated from the outer perimeter, the torque provided to the inner gimbal assembly is naturally increased by the leverage arm of the inner gimbal assembly.

Figure 1:
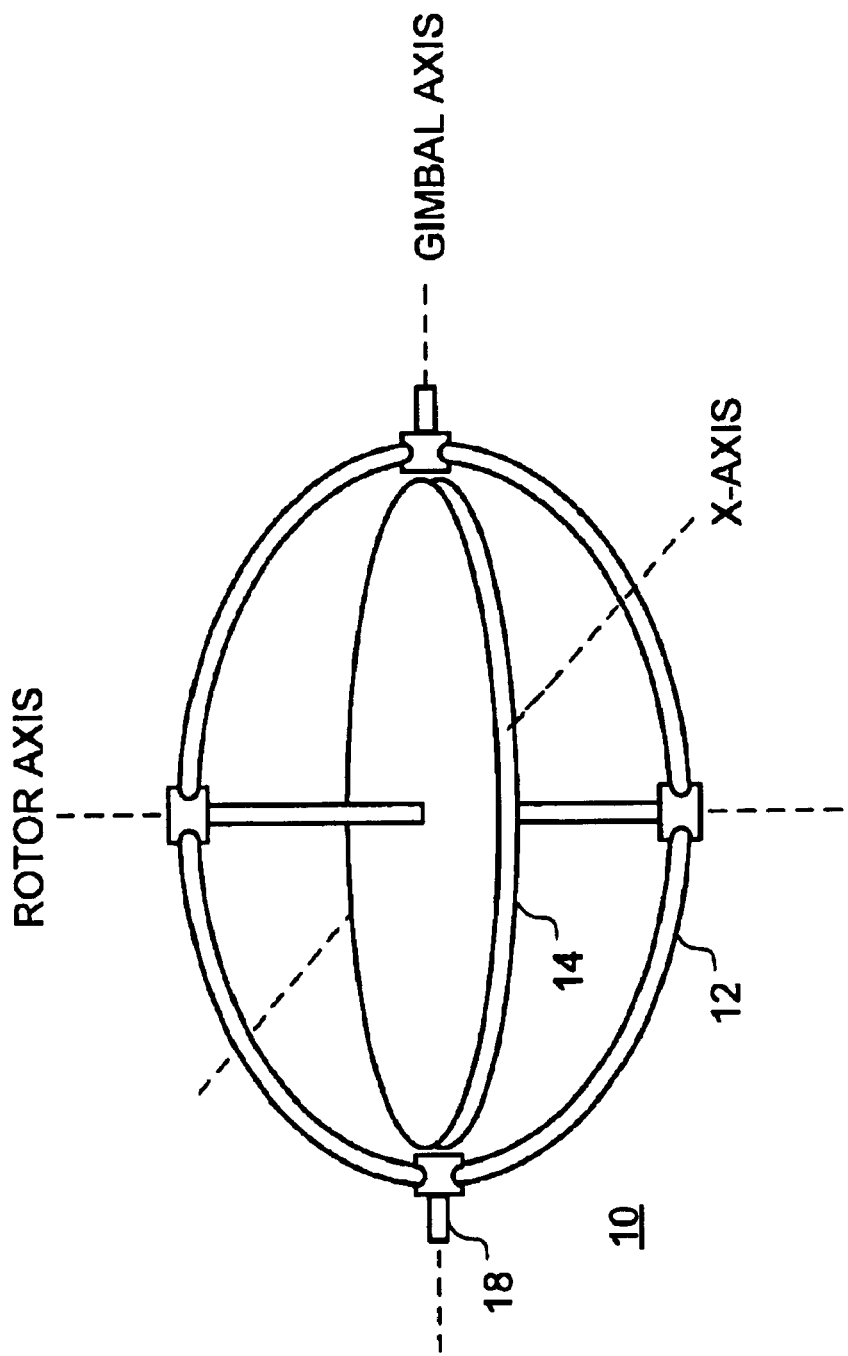
FIG. 1 is a schematic view of a simplified control moment gyroscope.

Turning now to FIG. 1, simplified diagram of a typical control moment gyroscope 10 is illustrated. The control moment gyroscope 10 is commonly used to provide attitude control for a vehicle such as a spacecraft. The simplified control moment gyroscope 10 includes a rotor 14 that spins around a rotor axis. The rotor 14 spins in an inner gimbal assembly that includes the gimbal 12 and can be rotated around a gimbal axis. When a rotational torque is provided on the gimbal 12, the gimbal assembly rotates and a torque is generated in the x-axis, normal to the rotor axis and gimbal axis. This torque is transferred to the vehicle through the support structure of the gyroscope 10. This torque, in combination with torques from other gyroscopes, can be used to provide attitude control for the vehicle. Again, FIG. 1 is a simplified diagram, and does not illustrate many features, such as the motors used to rotate the rotor 14 around the rotor axis.

Figure 2:
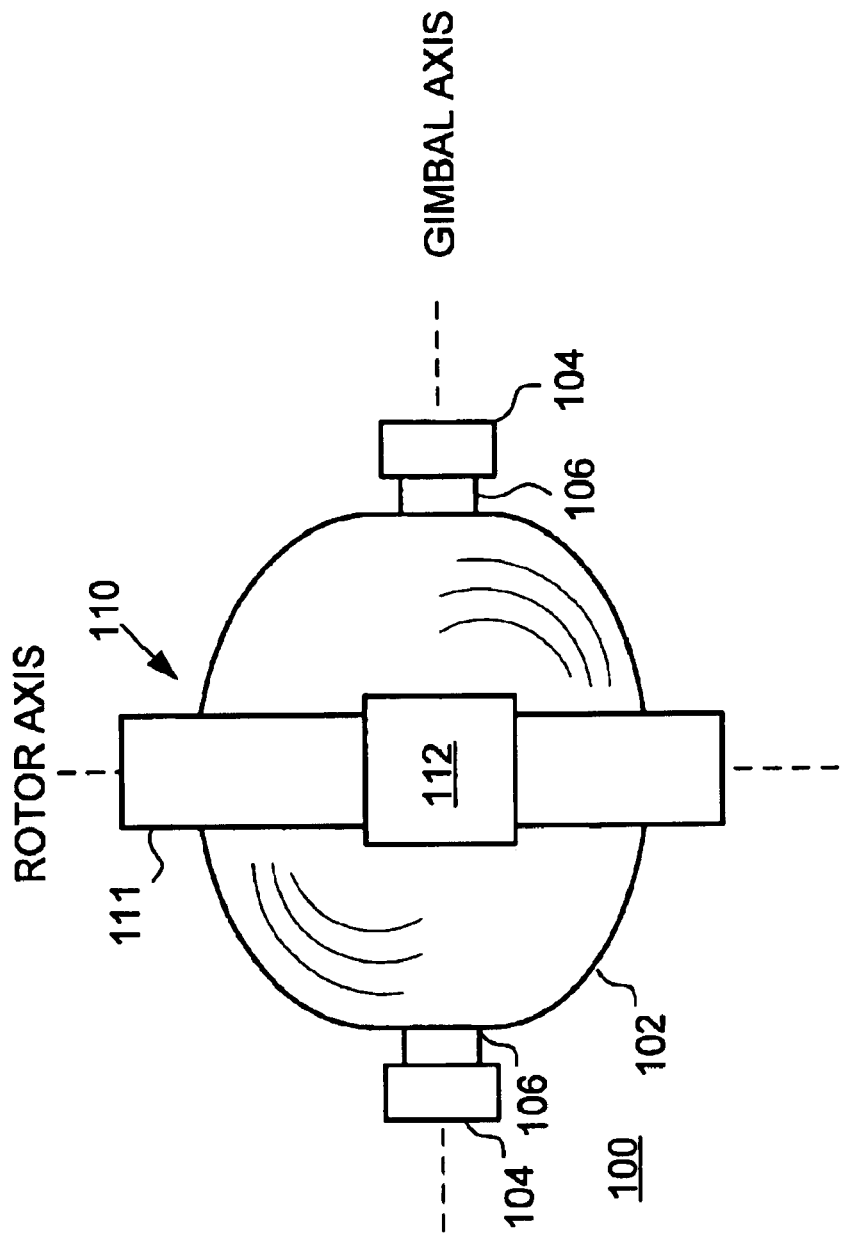
FIG. 2 is a first side view of a control moment gyroscope.
Figure 3:
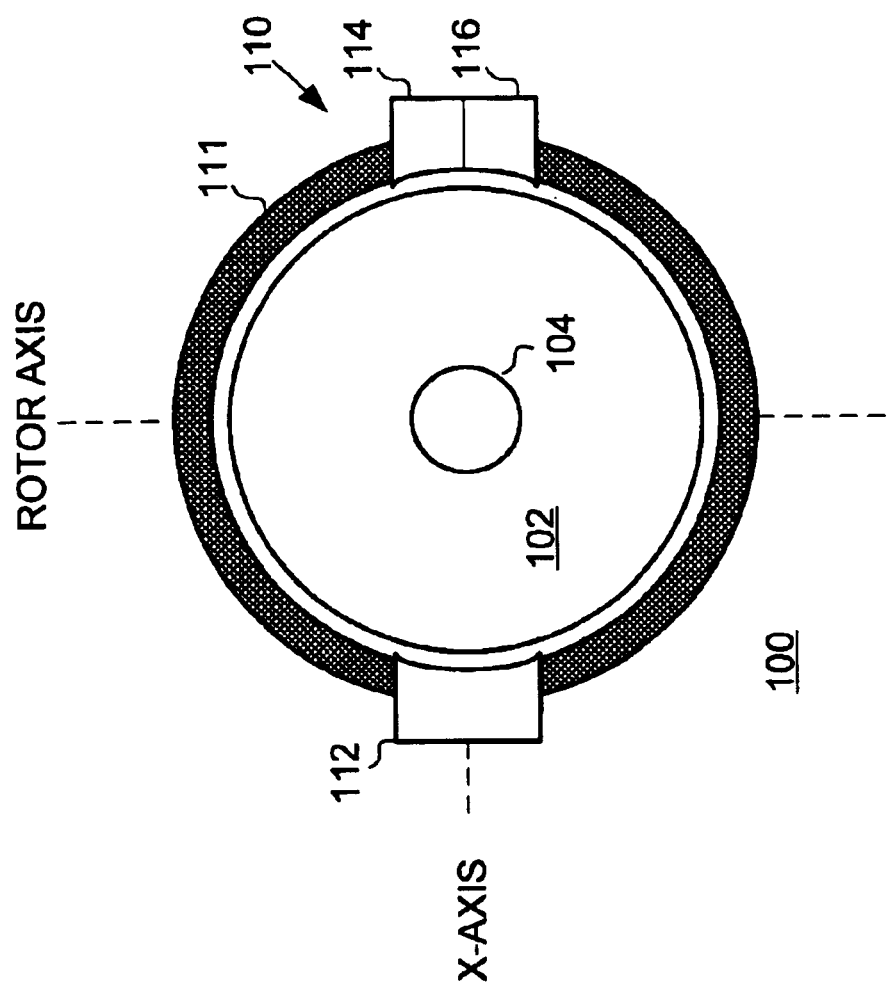
FIG. 3 is a second side view of a control moment gyroscope.

As stated above, the present invention provides an improved mechanism for rotating the inner gimbal assembly around the gimbal axis. Turning now to FIGS. 2 and 3, side views of a control moment gyroscope 100 with a radial actuator mechanism are illustrated schematically. FIG. 2 views the control moment gyroscope along the x-axis, while FIG. 3 views along the gimbal axis. The control moment gyroscope 100 includes an inner gimbal assembly 102 that rotates around the gimbal axis on gimbal bearings 104 and trunions 106. Inside the inner gimbal assembly, but not illustrated in FIGS. 2 and 3, would be the rotor similar to the rotor 14 in FIG. 1, and the motor and electronics used to spin the rotor. Again, during operation on the control moment gyroscope, the rotor spins inside the inner gimbal assembly 102. When the inner gimbal assembly 102 is rotated, a torque moment is created in the x-axis, normal to the rotor axis and the gimbal axis.

In accordance with the embodiments of the invention, the control moment gyroscope 100 includes a radial actuator mechanism 110. The radial actuator mechanism 110 is provided to rotate the inner gimbal assembly 102 around the gimbal axis. The radial actuator mechanism 110 comprises a circular ring 111 at the midpoint of the gimbal axis and a motor stator 112. The circular ring 111 extends around the outer periphery of the housing for the inner gimbal assembly 102. The circular ring 111 includes a torque motor rotor extending around the circumference of the circular ring 111. The motor stator 112 and the torque motor rotor on the circular ring 111 function together as a non-contact motor that is used to rotate the inner gimbal assembly 102 around the gimbal axis. The radial actuator mechanism 110 thus provides rotational force directly to the outer periphery of the housing. The length of the leverage arm provided by the inner gimbal assembly 102 increases the torque provided by the radial actuator mechanism 110. Additionally, the increased gimbal length, increased cost and decreased life associated with ordinary torque module assembly can be eliminated, and the operational bandwidth of the gyroscope increased.

The torque motor stator 112 and the torque motor rotor on ring 111 can be any suitable non-contact type. For example, the motors can be implemented using iron core brushless D.C. motors, ironless armature motors, stepper motors, linear motors and more. The motor would typically be implemented with bi-directional capabilities and have low torque ripple and cogging characteristics. Electronic subsystems used to drive the torque motor could be located on either a base ring assembly or on the vehicle. The fixed (stator) side of the motor would generally be a motor segment only.

In the illustrated embodiment, the radial actuator mechanism 110 also includes a radial position sensor. Specifically, radial actuator mechanism 110 includes an optical encoder pickoff 114 and the circular ring 111 includes an optical encoder pattern extending around the circumference of the ring. The optical encoder pickoff 114 and the optical encoder pattern printed on the side of the ring together function as an optical encoder that can accurately determine the angle of rotation for the inner gimbal assembly. The accuracy of the angle measurement is increased by the relatively large diameter of the circular ring, the corresponding increase in optical patterns that can be printed on the ring 111 and resolved by pickoff 114. In additional to measuring the radial position of the inner gimbal assembly, the optical encoder can be used to determine the gimbal rate of rotation by measuring the time rate of change of the gimbal angular position.

The optical encoder pickoff 114 and optical encoder pattern can be implemented using any suitable technology. For example, the optical encoder pattern can be formed on the ring 111 using any suitable photolithographic technique that provides sufficient resolution. An absolute optical encoder which retains the gimbal zero angle position is envisioned. Electronic subsystems for the optical encoder can be mounted on the base ring assembly or on the vehicle.

In the illustrated embodiment, the radial actuator mechanism 110 also includes a power and signal transfer device. The power and signal transfer device comprises a power-signal pickoff 116 and power-signal transfer ring on the circular ring 111. The power-signal pickoff 116 and power-signal together function to deliver power and control signals to the inner gimbal assembly 102. Preferably, the power-signal pickoff 116 and the power-signal transfer ring both include low and high frequency AC couplers. The low frequency AC coupler is used to deliver power to the inner gimbal assembly. The high frequency AC coupler is likewise used to deliver control signals to the inner gimbal assembly. Thus, both power and control signals can be provided to the inner gimbal assembly through the radial actuator mechanism 110.

The power signal pickoff 116 and power-signal transfer can be implemented using any suitable technology. For example, the low frequency AC coupler can use transformer AC induction techniques similar to power transformers. The high frequency couplers could use radio frequency transmitters and receivers and analog or digital waveform patterns for signal transmission.

The circular ring 111 preferably implemented as a single composite ring, in which the motor rotor, power-signal transfer ring and optical encoder pattern are embedded into the structure. The ring 111 can comprise multiple, independent layers for motor, encoder and power-signal transfer components. Redundant components for each function could be included in the ring to offer multiple channels of operation and increased reliability.

Figure 4:
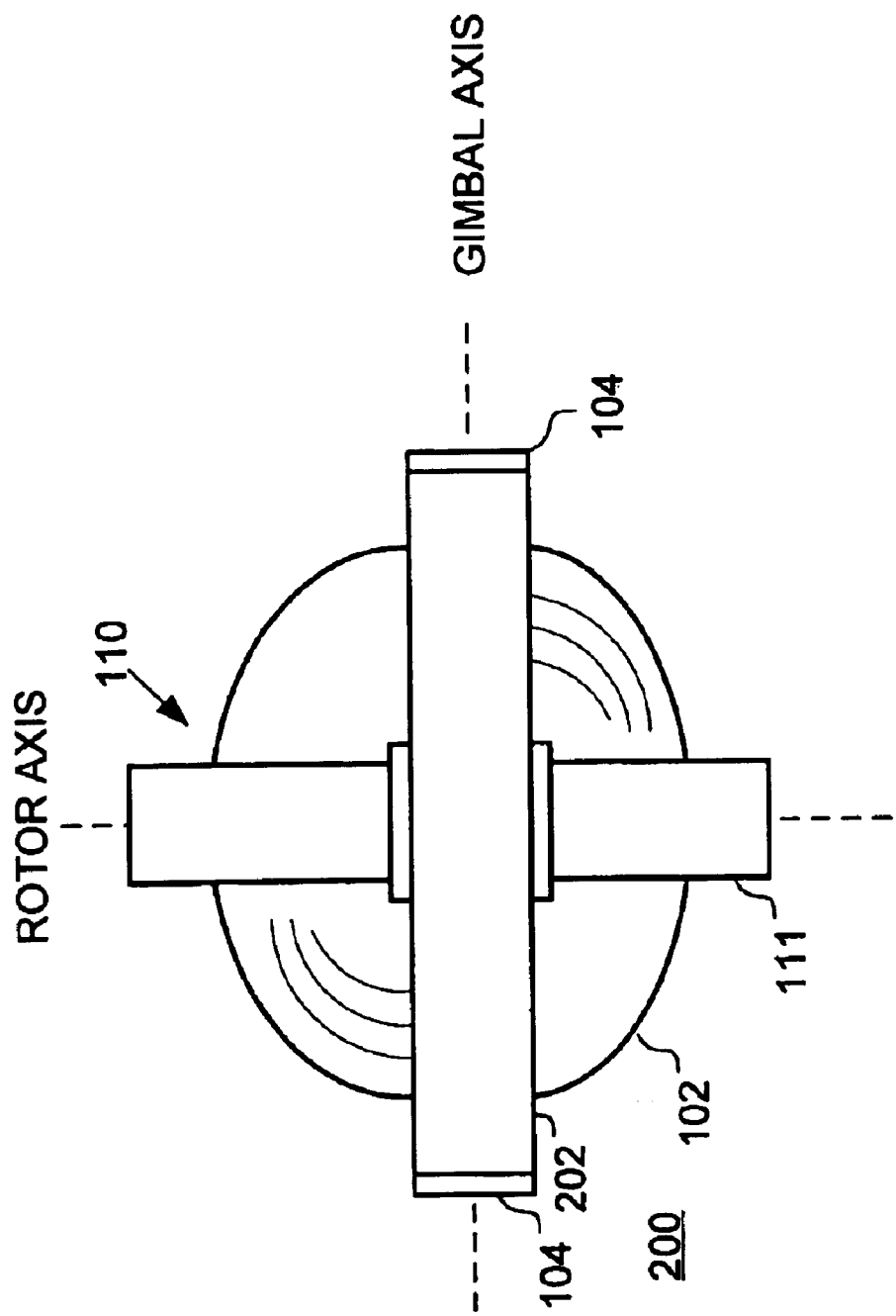
FIG. 4 is a second side view of a control moment gyroscope using a base ring assembly to mount the vehicle.

The radial actuator mechanism 110 can be implemented with a variety of different structures. For example, the control moment gyroscope can be mounted to a base ring assembly that connects the gyroscope to the vehicle. Turning now to FIG. 4, a control moment gyroscope inner gimbal assembly 102 is shown mounted in a base ring 202. The base ring 202 extends around the outside of the inner gimbal assembly 102 and is used to mount the gyroscope 200 in the vehicle. Typically, the base ring would be affixed to the gimbal bearings 104, allowing the inner gimbal assembly 102 to rotate in the base ring 202 when acted upon by the radial actuator mechanism 110.

A gyroscope that uses a base ring assembly 202 can be implemented in different ways. For example, in one implementation the motor stator 112 is affixed to the base ring 202, and the circular ring 111 is affixed to the inner gimbal assembly. In this implementation, the circular ring 111 rotates with the movement of the inner gimbal assembly, while the motor stator 112 is fixed on the base ring. Likewise, in this implementation, the optical encoder pickoff and power-signal pickoffs would also be fixed on the base ring. During operation of this implementation, the circular ring 111 rotates with the inner gimbal assembly. This implementation does have the disadvantage of adding additional mass to the rotated inner gimbal assembly, but may be desirable for some applications.

In another implementation, the circular ring 111 is affixed to the base ring 202 and the motor stator 112 is affixed to the inner gimbal assembly. In this implementation, the motor stator 112 rotates with the movement of the inner gimbal assembly, while the circular ring 111 is fixed to the base ring. In this implementation, the optical encoder pickoff and power-signal pickoff would also be fixed to and rotate with the inner gimbal assembly. This implementation typically has the advantage of less rotating mass, but may not be desirable for all applications.

Figure 5:
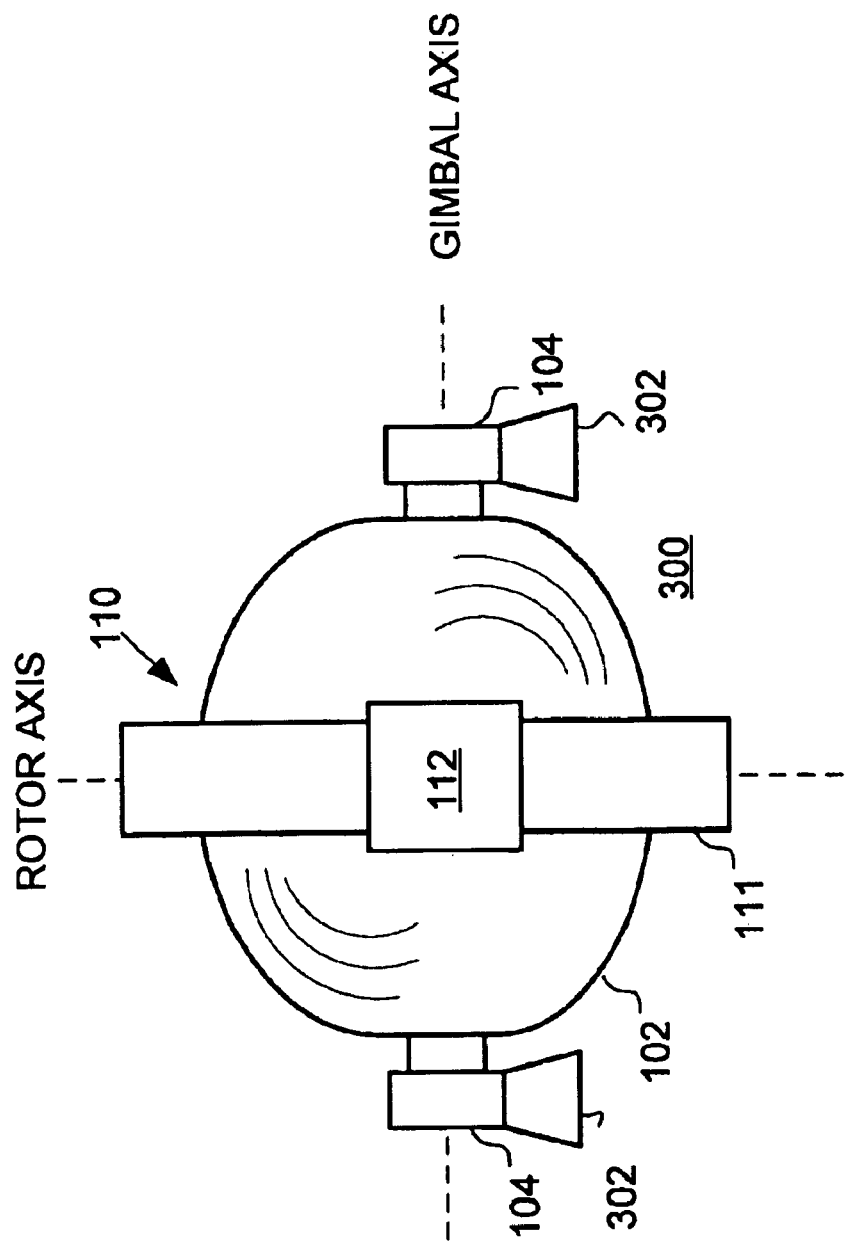
FIG. 5 is a second side view of a control moment gyroscope using pillow blocks to mount to the vehicle.

In other embodiments, the base ring assembly is not used. Instead, a different structure is used to affix the control moment gyroscope to the vehicle. For example, the control moment gyroscope can be affixed directly to the vehicle using a structure such as pillow blocks. Turning now to FIG. 5, a control moment gyroscope 300 is illustrated that uses pillow blocks 302 to attach to the vehicle. The pillow blocks can be attached to the gimbal bearings 104, to provide direct attachment of the gyroscope 300 to the vehicle. This embodiment has the advantage of not requiring the extra weight of a base ring assembly.

This embodiment, like the base ring embodiment, can be implemented in different ways. For example, in one implementation the motor stator 112 is affixed directly to the vehicle, and the circular ring 111 is affixed to the inner gimbal assembly. In this implementation, the circular ring 111 rotates with the movement of the inner gimbal assembly, while the motor stator 112 is fixed on the vehicle. Likewise, in this implementation, the optical encoder pickoff and power-signal pickoffs would also be fixed on the vehicle.

In another implementation, the circular ring 111 is affixed to the vehicle and the motor stator 112 is affixed to the inner gimbal assembly. In this implementation, the motor stator 112 rotates with the movement of the inner gimbal assembly, while the circular ring 111 is fixed to vehicle. In this implementation, the optical encoder pickoff and power-signal pickoff would also be fixed to and rotate with the inner gimbal assembly.

The embodiments of the present invention offer many potential advantages over prior art control moment gyroscopes. For example, the present invention has the possibility to achieve significant weight reduction in the control moment gyroscope. The elimination of the conventional torque motor assembly and sensor module assembly can result in weight reduction. Additionally, in embodiments that do not use a base ring assembly, the elimination of the base ring assembly can result in additional weight reductions.

As another example of potential advantage, because the invention eliminates the requirements for a separate torque motor assembly at the end of the gimbal axis, the resonant frequency caused by the torque motor assembly can be eliminated. This resonant frequency is associated with the inner gimbal assembly mass and the torque motor in the torque module assembly, separated by the stiffness of the torque motor assembly gear train. In prior art control moment gyroscopes, this resonant frequency typical limits the gimbal loop gain. Because the present invention eliminates the need for the torque motor assembly, this resonant frequency will not be encountered, allowing for higher loop gain and greater gimbal loop bandwidth.

The invention also provides for improved wear characteristics. In conventional control moment gyroscopes the gear train in the torque motor assembly and the slip ring brushes in the sensor module assembly are subject to significant wear, and are typically the items in the gyroscope that limit its operational lifetime. Because the invention does not require such gear trains or slip rings, the control moment gyroscope can have a significantly longer operational lifetime than conventional control moment gyroscopes.

The present invention thus provides a control moment gyroscope that overcomes many of the limitations of the prior art. The control moment gyroscope provides a radial actuator mechanism to provide rotation to an inner gimbal assembly around a gimbal axis. The radial actuator mechanism comprises a circular ring at the midpoint of the gimbal axis, the circular ring extending around the outer periphery of the inner gimbal assembly housing. The radial actuator mechanism rotates the inner gimbal assembly around the gimbal axis through the use of a non-contact motor that provides rotational force directly to the outer perimeter of the inner gimbal assembly. Because the inner gimbal assembly is rotated from the midpoint of the gimbal axis, a torque module assembly at the end of the gimbal axis is not required. Thus, the overall length of the control moment gyroscope can be reduced. Additionally, the cost and life limiting attributes of the torque module assembly can be eliminated, and the operational bandwidth of the gyroscope increased. Finally, because the inner gimbal assembly is rotated from the outer perimeter, the torque provided to the inner gimbal assembly is naturally increased by the leverage arm of the inner gimbal assembly.

In addition to providing rotational energy, the radial actuator mechanism can also provide rotational position sensing through an optical encoder. An optical encoder pattern is printed on a portion of the circular ring and is used by optical sensor to provide high resolution rotation measurement. Because the rotational position is provided by the optical encoder, a sensor module assembly at the end of the gimbal axis is not required, and the overall length can be further reduced. Additionally, the radial actuator mechanism can be used to power and signal delivery to the inner gimbal assembly. A low frequency AC coupler between the ring and the inner gimbal assembly can be use to deliver power to the inner gimbal assembly. A high frequency AC coupler can likewise be used deliver control signals to the inner gimbal assembly. Thus, both power and control signals can be provided to the inner gimbal assembly through the radial actuator mechanism.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A control moment gyroscope comprising:
   a) an inner gimbal assembly, the inner gimbal assembly including a rotor rotating on a rotor axis, the inner gimbal assembly rotateable on a gimbal axis to create a torque moment, the inner gimbal assembly including a housing surrounding the rotor and having a outer periphery perpendicular to the gimbal axis; and
   b) a radial actuator mechanism, the radial actuator mechanism including;
      i) a ring surrounding the outer periphery of the housing, the ring including a motor rotor;
      ii) a motor stator, the motor stator and motor rotor providing a controllable rotational force at the outer periphery of the housing to controllably rotate the inner gimbal assembly
      iii) a power-signal transfer device for transferring power and a control signal to the inner gimbal assembly, wherein the power-signal transfer device comprises a low frequency AC coupler and a high frequency AC coupler at least partially affixed to the ring.

2. The control moment gyroscope of claim 1 wherein the control moment gyroscope further includes a rotational position sensor.

3. The control moment gyroscope of claim 1 wherein the control moment gyroscope is affixed to a vehicle with a base ring assembly, and wherein the ring is affixed to the base ring assembly and the motor stator is affixed to the inner gimbal assembly.

4. The control moment gyroscope of claim 1 wherein the control moment gyroscope is affixed to a vehicle with a base ring assembly, and wherein the motor stator is affixed to the base ring assembly and the ring is affixed to the inner gimbal assembly.

5. The control moment gyroscope of claim 1 wherein the control moment gyroscope is affixed to a vehicle with pillow blocks, and wherein the ring is affixed to the vehicle and the motor stator is affixed to the inner gimbal assembly.

6. The control moment gyroscope of claim 1 wherein the control moment gyroscope is affixed to a vehicle with pillow blocks, and wherein the motor stator is affixed to the vehicle and the ring is affixed to the inner gimbal assembly.

7. A control moment gyroscope comprising:
   a) an inner gimbal assembly, the inner gimbal assembly including a rotor rotating on a rotor axis, the inner gimbal assembly rotateable on a gimbal axis to create a torque moment, the inner gimbal assembly including a housing surrounding the rotor and having a outer periphery perpendicular to the gimbal axis; and
   b) a radial actuator mechanism, the radial actuator mechanism including;
      i) a ring surrounding the outer periphery of the housing, the ring including a motor rotor;
      ii) a motor stator, the motor stator and motor rotor providing a controllable rotational force at the outer periphery of the housing to controllably rotate the inner gimbal assembly;
      iii) power-signal transfer device for transferring power and a control signal to the inner gimbal assembly, the power signal transfer device comprising a low frequency AC coupler and a high frequency AC coupler; and
      iv) a rotational position sensor, the rotational position sensor including an optical encoder pattern formed on the ring and an optical encoder pickoff.

* * * * *